United States Patent [19]

Buma et al.

[11] Patent Number: 4,836,511
[45] Date of Patent: Jun. 6, 1989

[54] VEHICLE AIR SUSPENSION CIRCUIT WITH A CHANGEOVER MEANS AND A LOW PRESSURE RESERVOIR THAT SURROUNDS A HIGH PRESSURE RESERVOIR

[75] Inventors: Shuuichi Buma; Nobutaka Ohwa, both of Toyota; Osamu Takeda, Susono; Hajime Kamimae, Toyota, all of Japan

[73] Assignee: Toyota Jidosha Kabushiki Kaisha, Aichi, Japan

[21] Appl. No.: 171,253

[22] Filed: Mar. 21, 1988

[30] Foreign Application Priority Data

Mar. 30, 1987 [JP] Japan ................. 62-47455[U]

[51] Int. Cl.⁴ ..................... B60G 17/04; B60G 11/30
[52] U.S. Cl. ................................. 267/64.16; 280/714
[58] Field of Search ............... 267/64.11, 64.16, 64.28, 267/DIG. 1; 280/714, 711, DIG. 1, 6 R, 6.1; 138/30, 31; 137/264; 60/413, 416; 220/3

[56] References Cited

U.S. PATENT DOCUMENTS

| | | | |
|---|---|---|---|
| 1,692,670 | 11/1928 | Mesurier | 220/3 |
| 3,874,692 | 4/1975 | Ono | 267/64.28 X |
| 4,520,840 | 6/1985 | Michel | 138/30 X |
| 4,540,188 | 9/1985 | Meloche et al. | 267/64.16 X |
| 4,625,994 | 12/1986 | Tanaka et al. | 280/711 X |
| 4,695,074 | 9/1987 | Kobayashi et al. | 280/DIG. 1 |

FOREIGN PATENT DOCUMENTS 60-119623 8/1985 Japan .

*Primary Examiner*—Robert J. Oberleitner
*Attorney, Agent, or Firm*—Oliff & Berridge

[57] ABSTRACT

A vehicle air suspension circuit having air suspensions for wheels and an air supply device which increases pressure of air taken from an air intake port and supplies the air to the air suspension. Moreover, this vehicle air suspension circuit is made up of a tank which receives the air discharged from the air suspension and is kept at the pressure higher than the atmospheric air pressure and a changeover valve which is provided to the air intake port of the air supply device and selects atmospheric air or the air in the tank as the intake air.

3 Claims, 1 Drawing Sheet

VEHICLE AIR SUSPENSION CIRCUIT WITH A CHANGEOVER MEANS AND A LOW PRESSURE RESERVOIR THAT SURROUNDS A HIGH PRESSURE RESERVOIR

FIELD OF THE INVENTION

The present invention relates to an air circuit of air suspension to be used for a vehicle suspension system.

BACKGROUND OF THE INVENTION

An air suspension utilizing compressible characteristic of air is often used for realizing sophisticated control in connection with an electronic control device because it is comparatively easier to change the suspension characteristics.

Such control items include adjustment of body height or adjustment of vehicle attitude and can be realized by supplying the adequate amount of air to the air chamber of air suspension of each wheel and exhausting the air therefrom. However, for the sophisticated suspension control, it is essential to adequately change the supply or exhaust rate of air in accordance with respective control purposes. For instance, when it is required to increase only the body height, it is desirable that the air supply rate to the air chamber of air suspension of each wheel is not so quick in order to eliminate any shock to crews. On the contrary, a quick supply rate of air is desirable for stabilizing attitude of vehicle during running on curved road. In other cases, it is also desired by the driver to change the rate of adjustment of body height.

In order to change the supply rate of air to the air suspension depending on purposes, a device where the reservoir tanks are provided to reserve the compressed air in the circuit and two systems of paths, a small diameter pipe and a large diameter pipe, are provided to connect such reservoir tanks to the air chambers of the suspension unit of respective wheels (Japanese Laid-open Pat. No. 119623/1985).

However, the system of the prior art explained earlier requires two systems of pipings and therefore is complicated. Particularly, since a passenger car requires sophisticated control of attitude, individual supply and exhaust of air are required for the air suspension of each wheel, but the system mentioned above requires many pipings and generates a problem of increased weight.

SUMMARY OF THE INVENTION

The primary object of the present invention is to provide a vehicle air suspension circuit which is capable of changing a supply rate of air to the air suspension of each wheel with a simplified structure.

The object of the present invention is to provide a vehicle air suspension circuit in which an adjustment of body height can be realized in the speed of two steps in accordance with purposes, and a degree of freedom in suspension control can be as much increased.

The object of the present invention is to provide a vehicle air suspension circuit which quickly pressurizes the air, and the air can also be quickly supplied to the air suspension.

The object of the present invention is to provide a vehicle air suspension circuit in which the air supply rate to the air suspension of a wheel can be changed by switching the setting position of a changeover switch.

In general, the foregoing and other objects will be carried out, in a vehicle air suspension circuit including air suspensions of wheels and an air supply means to said air suspensions of wheels, said air supply means increasing the pressure of air sucked therein from an air suction port, by an improvement comprising; an air tank which reserves discharged air from said air suspensions of wheels and maintains the pressure therein above atmospheric pressure; and a changeover valve mounted on said air suction port and changing over the air pressure to be sucked into said air suction port of said air supply means to the atmospheric pressure or pressure in said tank.

DETAILED DESCRIPTION OF THE INVENTION

Figure 1:
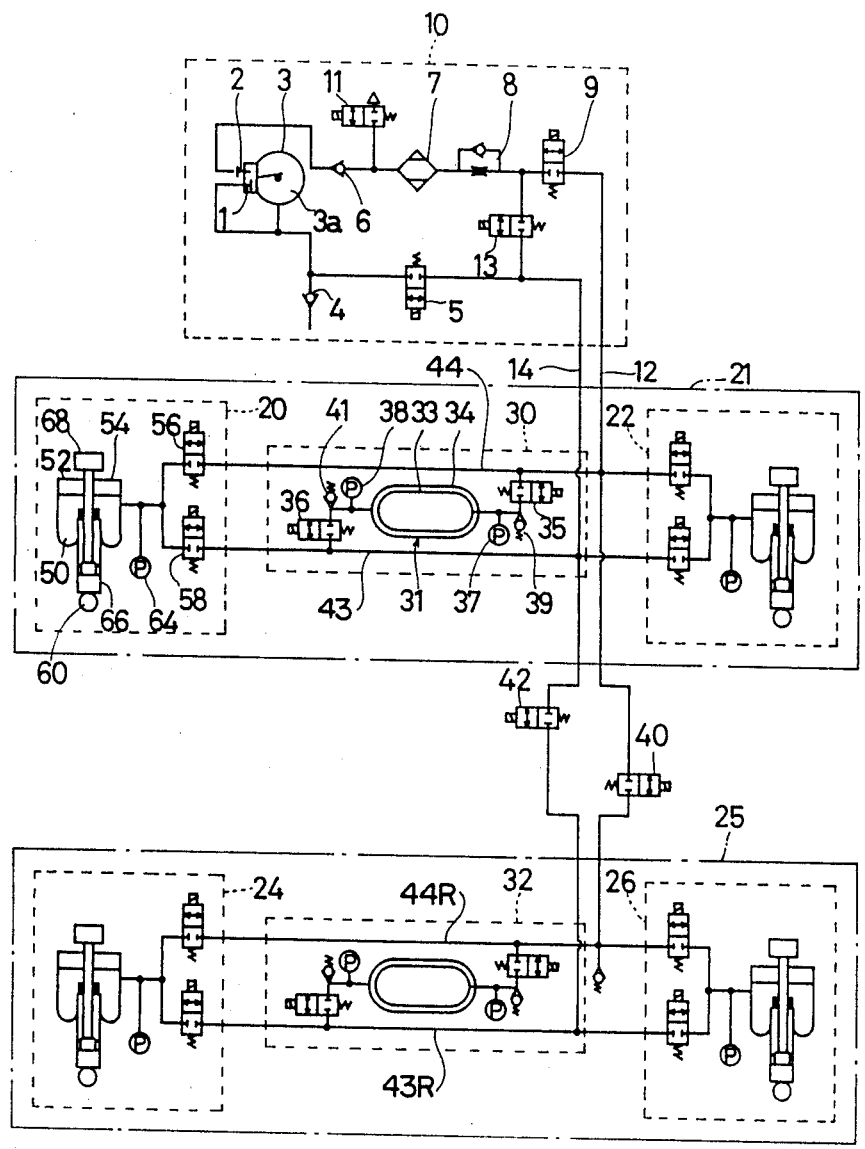
FIG. 1 is a circuit diagram of an air suspension system of a vehicle as an embodiment of the present invention.

An example of adopting the present invention to an air suspension system of a vehicle is explained hereunder referring to the accompanying drawing. This system can roughly be divided into a compressed air supply exhaust system 10, suspension systems of respective wheels 20, 22, 24, 26 and reservoir systems 30, 32 including high and low pressure reservoir tanks. Four suspension systems are divided into a front wheels system 21 including left and right front suspensions 20, 22 and a rear wheels system 25 including left and right rear suspensions 24, 26, and reservoir systems 30, 32 are provided to respective systems 21, 25.

A supply pipe 12 and an exhaust pipe 14 are connected between the compressed air supply exhaust system 10 and supply pipes 44, 44R and exhaust pipes 43, 43R of the front wheels system 21 and rear wheels system 25, and valves (CVH) 40 and (CVL) 42 for adjusting pressure difference resulting from difference of load distribution between the front and rear wheels are provided respectively between the front wheels system 21 and rear wheels system 24 of pipes 12, 14.

A pump (CM) 3 having a suction port 1 and an exhaust port 2 is provided to the compressed air supply exhaust system 10. The suction port 1 of pump 3 is opened to the atmospheric air through a non-return valve 4 but an exhaust pipe 14 is connected between the suction port 1 and non-return valve 4 through a flow control return valve (FRV) 5. The pipe 14 connected to the suction port 1 is branched in the course thereof and is opened to a lower chamber 3a of piston of the pump 3 in order to alleviate a torque load at the time of starting the pump 3 and during operation of the pump.

The exhaust port 2 of pump 3 is opened to the supply pipe 12 through a non-return valve 6, an air dryer 7, a oneway throttle valve 8 and a flow control main valve (FCV) 9. An exhaust valve (EXV) 11 opened to the atmospheric air is provided between the non-return valve 6 and air dryer 7 in the air supply side. In the same way, the exhaust pipe 14 is connected to the supply pipe 12 between the oneway throttle valve 8 and flow control main valve (FCV) 9 through a flow control bypass valve (FBV) 13.

Since the reservoir systems 30, 32 have the same structure, explanation will be made only to the reservoir system 30 of the front wheel system 21. The reservoir system 30 is provided with a reservoir tank 31 having the double tank structure for high and low pressure (a high pressure reservoir tank 33 is provided in the inner side while a low pressure reservoir tank 34 in the outer side, thereby making small the pressure difference between the inner and outer side of the high pressure reservoir tank 33 and enhancing safety). A pipe connecting the supply pipe 12 and high pressure reservoir tank 33 is provided with a front reservoir high pressure valve (RHFV) 35, while the pipe connecting the exhaust pipe 14 and low pressure reservoir tank 34 is provided with a front reservoir low pressure valve (RLFV) 36. Moreover, respective tanks 33, 34 are respectively provided with pressure sensors 37, 38 and relief valves 39, 41. The corresponding valve of reservoir system 32 of rear wheels system 25 are given the letter R in place of the third letter F of the characters of the valve symbols.

Since the structure and function of the suspension system of each wheel are the same, explanation will be made only to the suspension system 20 of the left front wheel. The suspension system 20 includes an air suspension body 54 having an air chamber 50, a leveling valve (LFLV) 56 and a discharge valve (DFLV) 58 for supplying and discharging compressed air to/from the air chamber 50. The air chamber 50 of air suspension body 54 is provided with a pressure sensor 64. The air suspension body 54 is provided with a shock absorber 66 which shows variable damping forces in addition to the air chamber and therefore it also provides an actuator 68 for altering damping force. The air suspension body 54 is fixed to a vehicle body not illustrated at an upper part 52 of the air chamber 50 and is also fixed to a suspension arm of the front wheel not illustrated at a lower part 60 of the shock absorber 66. The valves corresponding to the leveling valve (LFLV) 56 and discharge valve (DFLV) 58 in each system of the right front suspension 22, left rear suspension 24 and right rear suspension 26 are indicated by FR, RL, RR in place of the symbols FL.

The air pressure circuit has been explained above and an electrical circuit is then explained briefly hereunder. Respective pressure sensors are connected to an electronic control device not illustrated and pressure signals of tanks and air chambers are input to the electronic control device. Each wheel is provided with a level meter not illustrated and a body height data at each wheel is also input to the electronic control device. Moreover, each valve is formed by a 2-position electromagnetic valve and it is set to the ON or OFF position depending on a drive current sent from the electronic control device.

The electronic control device carries out calculation depending on a preloaded program for adjustment of body height and vehicle attitude on the basis of the input signals sent from respective pressure sensors, level meter and other sensors, calculates the amount of air to be supplied to the air chamber of each wheel and that to be discharged therefrom and moreover determines whether supply and discharge of air must be done at a high speed or low speed. The electronic control device supplies the drive current to the related 2-position electromagnetic valve based on the value thus calculated and high speed or low speed information and executes predetermined adjustment of body height and vehicle attitude. In the case of the adjustment of vehicle attitude, a damping force of the shock absorber 66 is also changed.

Operations for adjustment of body height of the system of the present invention are explained hereunder focusing on the operations of pump 3 provided in the compressed air supply exhaust system 10 to which the present invention is adopted. For instance, when a passenger rides in a left front seat of the car under the condition that only a driver takes a seat keeping horizontal the car attitude, the level meter of left front wheel side detects reduction of body height in the left front wheel side and sends the detection signal to the electronic control device. The electronic control device supplies the air to the air chamber 50 of air suspension 54 of left front wheel in order to make horizontal again the attitude of car. I this case, the electronic control device determines whether the air is supplied at a high speed or a low speed to the air chamber 50 of air suspension body 54 of left front wheel in accordance with the condition of changeover switch provided at the instrument panel in front of the driver's seat not illustrated. The changeover switch is provided for the driver to select whether the air is supplied at a high speed or low speed or whether adjustment of body height is carried out quickly or not in order to realize shock-free adjustment.

Low speed supply of air to the air chamber 50 can be conducted by taking the air for the pump 3 from the atmospheric air. In practice, the flow control return valve (FRV) 5 is set to the OFF position so that the air sent from the low pressure reservoir tanks 34 (including the tank of the rear wheels system) is no longer sucked by the pump 3 and thereby only the air taken from the atmospheric air is supplied to the suction port 1 through the non-return valve 4.

High speed air supply to the air chamber 50 is conducted by taking the air to be sucked by the pump 3 from the low pressure reservoir tanks 34 (including the tank of rear wheels system). In practice, the flow control return valve (FRV) 5 is set to the ON position so that the air sent from the low pressure reservoir tank 34 is sucked by the pump 3. In this case, as will be described later, since the air pressure of low pressure reservoir tank 34 is higher than the atmospheric air pressure, the air taken from the atmospheric air is shielded by the non-return valve 4 and is not supplied to the suction port 1. Moreover, since the pump 3 compresses the air of pressure which is higher than the atmospheric pressure, the supply speed of high pressure air becomes higher than the case where the air taken from the atmospheric air is compressed.

The air discharged from the pump 3 passes through the non-return valve 6 and dryer 7 eliminating water content. Thereafter, the air passes through the oneway throttle valve 8 without resistance and is then supplied to the supply pipe 12 through the flow control main valve (FCV) 9 being set to the ON position. The air compressed by high pressure of supply pipe 12 enters the air chamber 50 passing through the leveling valve of left front wheel (LFLV) 56 being set to the ON position and increases body height of left front wheel by expanding the air suspension 54.

Conditions of respective valves controlled during operations for low speed and high speed increase of each wheel are summarized in Table 1. In any case, the valves other than that explained are set to OFF position. In the case of low speed increase of left front wheel, only the pump (CM) 3, flow control main valve (FCV) 9 and leveling valve (LFLV) 56 are set to the ON position. Similarly, when only the right front wheel is increased at a low speed, the corresponding leveling valve (LFRV) of the right front suspension 22 is set to the ON position. Moreover, the control is carried out to simultaneously increase the right and left rear wheels in the system of the present invention, but in this case the valve (CVH) 40 of the supply pipe between the front and rear wheels and the leveling valves (LRLV, LRRV) of suspensions 24, 26 of left and right rear wheels are set to the ON position simultaneously.

TABLE 1

ON-OFF CONDITIONS OF VALVES DURING OPERATIONS (O represents ON; others represent OFF)

| Valve | Low speed increase | | | | High speed increase | | | |
|-------|----|----|----|------|----|----|----|------|
|       | RF | LF | RL | Rear | RF | LF | RL | Rear |
| CM    | O  | O  |    | O    | O  | O  |    | O    |
| EXV   |    |    |    |      |    |    |    |      |
| FCV   | O  | O  |    | O    | O  | O  |    | O    |
| FBV   |    |    |    |      |    |    |    |      |
| FRV   |    |    |    |      | O  | O  |    | O    |
| LFRV  | O  |    |    |      | O  |    |    |      |
| LFLV  |    | O  |    |      |    | O  |    |      |
| LRRV  |    |    | O  |      |    |    | O  |      |
| LRLV  |    |    | O  |      |    |    | O  |      |
| DFRV  |    |    |    |      |    |    |    |      |
| DFLV  |    |    |    |      |    |    |    |      |
| DRRV  |    |    |    |      |    |    |    |      |
| DRLV  |    |    |    |      |    |    |    |      |
| RFV   |    |    |    |      |    |    |    |      |
| RRV   |    |    |    |      |    |    |    |      |
| RLFV  |    |    |    |      | O  | O  |    |      |
| RLRV  |    |    |    |      |    |    |    | O    |
| CVH   |    |    | O  |      |    |    | O  |      |
| CVL   |    |    |    |      |    |    |    | O    |

In the case of the high speed increase of left front wheel, the pump (CM) 3, flow control main valve (FCV) 9, leveling valve (LFLV) 56 are set to the ON position like the above case and moreover the front reservoir low pressure valve (RLFV) 36 and flow control return valve (FRV) 5 of low pressure reservoir tank 34 are also set to the ON position. This setting condition is also adopted to the increase of right front wheel. Moreover, it is basically the same for the increase of rear wheels, but since the total amount of air is considered within the rear wheels system 25, the rear reservoir low pressure valve (RLRV) and the valve (CVL) 42 of discharge pipe between the front an rear wheels are set to the ON position so that the air can be supplied from the low pressure reservoir tank of rear wheel reservoir system 32.

In the case of reducing the body height, for example, the air in the air chamber 50 of air suspension of the left front wheel is discharged by setting the discharge valve 58 to the ON position and the air discharged is kept within the low pressure reservoir tank 34. In this case, the electronic control device controls the front reservoir low pressure valve (RLFV) 36, flow control bypass valve (FBV) 13 and exhaust valve (EXV) 11 as required for ON and OFF positions in order to keep the pressure in the low pressure reservoir tank 34 at a predetermined value which is higher than the atmospheric pressure based on the signals sent from the pressure senors 38.

Even in the case of not adjusting body height, the electronic control device controls the front reservoir low pressure valve (RLFV) 36, the flow control bypass valve (FBV) 13, the rear reservoir low pressure valve (RLRV) and the valve (CVH) 40 as required for ON and OFF positions in order to keep the pressure in the low pressure reservoir tank 34 at a predetermined value which is higher than the atmospheric pressure by operating the pump 3 based on the signals sent from the pressure sensor 38.

In above embodiment, the element having the function combining the flow control return valve (FRV) 5 and non-return valve 4 corresponds to the changeover valve having the structure explained earlier. It is also possible to form such valve with a mono-function changeover valve.

As explained above, the air suspension system of the present invention is capable of selecting the air supply source of pump 3 from two kinds of sources of atmospheric air and low pressure (higher than the atmospheric air pressure) reservoir tank 34 with a simple structure and therefore body height increasing speed can be changed in two steps. Moreover, since increasing speed can still further be improved by supplying the air to the air chamber 50 of each wheel from the high pressure reservoir tank 33 in place of the pump 3, the present invention employs the structure to select the body height increasing speed in total of three kinds of rates.

The above explanation refers only to adjustment of body height, but the present invention can also be adopted in the same manner to stabilization of attitude while the car makes turning or braking.

It should be understood that although a certain specific embodiment of the invention has been shown and described for the purpose of illustration, it will of course be apparent that the invention is not limited to the embodiment illustrated and described, but in its broadest aspects it includes all equivalent embodiment and modifications which come within the scope of the invention.

What is claimed is:

1. A vehicle air suspension circuit, comprising:
   a pressurized air source having a suction port and an exhaust port;
   front and rear wheel systems, each including left and right suspensions connected by a first supply pipe having two leveling valves and a first exhaust pipe having two discharge valves;
   high- and low-pressure reservoir tanks disposed in each of said front and rear wheel systems and connected to said first supply pipes and said first exhaust pipes via high- and low-pressure valves respectively, said low pressure air reservoir tank having a predetermined pressure higher than atmospheric pressure;
   a second supply pipe connecting said exhaust port of said pressurized source to said first supply pipe of said front and rear wheel systems;
   a second exhaust pipe connecting said suction port of said pressurized source to said first exhaust pipes of said front and rear wheel systems;
   a changeover means disposed on said second exhaust pipe at a position between said suction port of said pressurized air source and said first exhaust pipe of said front wheel system, said changeover means switching between air coming from said low-pressure reservoir tanks via said first and second exhaust pipes and atmospheric air;
   a flow-controlling bypass valve disposed between said second supply pipe and said second exhaust pipe; and
   an exhaust valve disposed on said second supply pipe.

2. A vehicle air suspension circuit as claimed in claim 1, wherein said changeover means comprises a non-return inlet valve and a flow control valve, said non-return inlet valve permitting influx of atmospheric air into said second exhaust pipe, said flow control valve being disposed at a position upstream of said non-return inlet valve.

3. A vehicle air suspension circuit as claimed in claim 1, wherein said low-pressure reservoir tank surrounds said high-pressure reservoir tank forming a space therebetween.

* * * * *